US009007935B2

(12) United States Patent
Haswarey et al.

(10) Patent No.: US 9,007,935 B2
(45) Date of Patent: Apr. 14, 2015

(54) ENVIRONMENTAL AWARE PCI MANAGEMENT

(75) Inventors: Bashir Haswarey, Elmhurst, IL (US); Faisal Farooqi, Hoffman Estates, IL (US); John Milligan, Arlington Hts, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 161 days.

(21) Appl. No.: 13/398,096

(22) Filed: Feb. 16, 2012

(65) Prior Publication Data

US 2013/0215744 A1 Aug. 22, 2013

(51) Int. Cl.
| | | |
|---|---|---|
| *H04W 16/10* | (2009.01) | |
| *H04W 24/02* | (2009.01) | |
| *H04W 16/24* | (2009.01) | |
| *H04W 16/00* | (2009.01) | |
| *H04W 72/12* | (2009.01) | |
| *H04W 84/04* | (2009.01) | |

(52) U.S. Cl.
CPC .............. *H04W 16/10* (2013.01); *H04W 72/12* (2013.01); *H04W 84/045* (2013.01); *H04W 24/02* (2013.01); *H04W 16/24* (2013.01)

(58) Field of Classification Search
None
See application file for complete search history.

(56) References Cited

U.S. PATENT DOCUMENTS

| | | | | |
|---|---|---|---|---|
| 6,522,885 B1* | 2/2003 | Tang et al. | ..................... | 455/447 |
| 2007/0019594 A1* | 1/2007 | Perumal et al. | ................ | 370/338 |
| 2009/0129291 A1 | 5/2009 | Gupta et al. | .................. | 370/254 |
| 2010/0178912 A1* | 7/2010 | Gunnarsson et al. | ......... | 455/423 |
| 2010/0291934 A1* | 11/2010 | Lopes | ............................ | 455/446 |
| 2011/0021205 A1* | 1/2011 | Horneman et al. | ........... | 455/450 |
| 2011/0038279 A1 | 2/2011 | Cho et al. | ...................... | 370/254 |
| 2011/0038326 A1 | 2/2011 | Davies et al. | ................. | 370/329 |
| 2011/0059744 A1 | 3/2011 | Won et al. | ..................... | 455/450 |
| 2011/0201345 A1 | 8/2011 | Han et al. | ...................... | 455/450 |
| 2011/0274097 A1* | 11/2011 | Zhang et al. | .................. | 370/338 |

(Continued)

FOREIGN PATENT DOCUMENTS

WO WO 2011023234 A1 3/2011

OTHER PUBLICATIONS

Bandh et al., "Graph Coloring Based Physical-Cell-ID Assignment for LTE Networks," IWCMC '09 Proceedings of the 2009 Int'l Conf. on Wireless Commc'ns. and Mobile Computing: Connecting the World Wirelessly, pp. 116-120, Jun. 21-24, 2009.*

(Continued)

*Primary Examiner* — Andrew Chriss
*Assistant Examiner* — Joshua A Kading
(74) *Attorney, Agent, or Firm* — Harrington & Smith

(57) ABSTRACT

Geographical coordinates for a cell are obtained based upon the location of the cell, generating a physical layer cell identity matrix for the cell based upon a subset of physical layer cell values allocated for the location of the cell which is performed to eliminate interference among primary and secondary synchronization signaling for the cell based upon a subset of physical layer cell values allocated for the location of the cell, using one of the cell identities contained in the generated matrix for the new cell which is mapped to the location of the new cell and monitoring for physical layer cell color code collisions among neighboring cells reported by one or more user equipment in range of the new cell and neighboring cells, and if a collision occurs re-generate a physical layer cell matrix using unallocated physical layer cell values for the location of the new cell.

20 Claims, 11 Drawing Sheets

(56) References Cited

U.S. PATENT DOCUMENTS

2012/0122467 A1* 5/2012 Auer et al. ............... 455/452.1
2013/0172031 A1* 7/2013 Calippe et al. ............ 455/509

OTHER PUBLICATIONS

Steven Dutch, "The Universal Transverse Mercator System", http://www.uwgb.edu/dutchs/FieldMethods/UTMSystem.htm, (Jan. 11, 2000), (5 pages).
http://en.wikipedia.org/wiki/Military_grid_reference_system, (Oct. 22, 2011), (6 pages).
Qualcomm Europe et al: "Framework for distributed PCI selection"; 3GPP Draft; R3-082228; 3rd Generation Partnership Project (3GPP); Mobile Competence Centre; 650, Route des Lucioles; F-06921 Sophia-Antipolis Cedex; France; vol. RAN WG3, No. Jeju Island; Aug. 25, 2008, XP050165269, [retrieved on Aug. 25, 2008] the whole document.
Nokia Siemens Networks et al: "Solution(s) to the 36.902A s Automated Configuration of Physical Cell Identity Use Case"; 3GPP Draft; R3-080812 (Phyid Autoconf); 3rd Generation Partnership Project (3GPP); Mobile Competence Centre; 650, Route des Lucioles; F-06921 Sophia-Antipolis Cedex; France; vol. RAN WG3, No. Shenzhen, China; Mar. 26, 2008, XP050164010, [retrieved on Mar. 26, 2008]; paragraph [2.2.1]—paragraph [2.2.4]; paragraph [2.4.1]—paragraph [2.4.2].

* cited by examiner

FIG. 6A

12x12 Matrix (630)

PCI VALUES / PCI RANGE USE [0, 149]

| 0 | 7 | 14 | 9 | 16 | 23 | 18 | 25 | 32 | 27 | 34 | 41 |
|---|---|---|---|---|---|---|---|---|---|---|---|
| 8 | 3 | 10 | 17 | 12 | 19 | 26 | 21 | 28 | 35 | 30 | 37 |
| 4 | 11 | 6 | 13 | 20 | 15 | 22 | 29 | 24 | 31 | 38 | 33 |
| 36 | 43 | 50 | 45 | 52 | 59 | 54 | 61 | 68 | 63 | 70 | 77 |
| 44 | 39 | 46 | 53 | 48 | 55 | 62 | 57 | 64 | 71 | 66 | 73 |
| 40 | 47 | 42 | 49 | 56 | 51 | 58 | 65 | 60 | 67 | 74 | 69 |
| 72 | 79 | 86 | 81 | 88 | 95 | 90 | 97 | 104 | 99 | 106 | 113 |
| 80 | 75 | 82 | 89 | 84 | 91 | 98 | 93 | 100 | 107 | 102 | 109 |
| 76 | 83 | 78 | 85 | 92 | 87 | 94 | 101 | 96 | 103 | 110 | 105 |
| 108 | 115 | 122 | 117 | 124 | 131 | 126 | 133 | 140 | 135 | 142 | 149 |
| 116 | 111 | 118 | 125 | 120 | 127 | 134 | 129 | 136 | 143 | 138 | 145 |
| 112 | 119 | 114 | 121 | 128 | 123 | 130 | 137 | 132 | 139 | 146 | 141 |

10x10 Matrix (620)

PCI VALUES / PCI RANGE USE [0, 122]

| 0 | 7 | 6 | 13 | 12 | 19 | 18 | 25 | 24 | 31 |
|---|---|---|---|---|---|---|---|---|---|
| 8 | 3 | 14 | 9 | 20 | 15 | 26 | 21 | 32 | 27 |
| 4 | 11 | 10 | 17 | 16 | 23 | 22 | 29 | 28 | 35 |
| 30 | 37 | 36 | 43 | 42 | 49 | 48 | 55 | 54 | 61 |
| 38 | 33 | 44 | 39 | 50 | 45 | 56 | 51 | 62 | 57 |
| 34 | 41 | 40 | 47 | 46 | 53 | 52 | 59 | 58 | 65 |
| 60 | 67 | 66 | 73 | 72 | 79 | 78 | 85 | 84 | 91 |
| 68 | 63 | 74 | 69 | 80 | 75 | 86 | 81 | 92 | 87 |
| 64 | 71 | 70 | 77 | 76 | 83 | 82 | 89 | 88 | 95 |
| 98 | 93 | 104 | 99 | 110 | 105 | 116 | 111 | 122 | 117 |

6x6 Matrix (610)

PCI VALUES / PCI RANGE USE [150, 185]

| 150 | 151 | 164 | 165 | 178 | 179 |
|---|---|---|---|---|---|
| 152 | 153 | 166 | 167 | 174 | 175 |
| 154 | 155 | 162 | 163 | 176 | 177 |
| 156 | 157 | 170 | 171 | 184 | 185 |
| 158 | 159 | 172 | 173 | 180 | 181 |
| 160 | 161 | 168 | 169 | 182 | 183 |

ENVIRONMENTAL AWARE PCI MANAGEMENT

TECHNICAL FIELD

The exemplary and non-limiting embodiments of this invention relate generally to wireless communication systems, methods, devices and computer programs and, more specifically, relate to managing PCI allocation to cells.

BACKGROUND

This section is intended to provide a background or context to the exemplary embodiments of the invention. The description herein may include concepts that could be pursued, but are not necessarily ones that have been previously conceived, implemented or described. Therefore, unless otherwise indicated herein, what is described in this section is not prior art to the description in this application and is not admitted to be prior art by inclusion in this section.

Enhancements to mobile communication systems are currently being investigated to improve the experience of mobile users who use those systems in densely populated areas. In particular, mobile operators have responded to user demands in densely populated urban areas by deploying more access points and by adding or expanding existing coverage areas. Access points are typically evolved node base stations (eNBs), or remote radio heads (RRHs), as specified in the Long Term Evolution Advanced (LTE-A). Coverage areas are defined in terms of the traditional cellular concept of a macrocell, which is a combined geographic area divided into three 120° areas of a circle and a radius of several kilometers. Coverage areas can further be defined by delineating each sector into individual cells such as a single smaller macro cell, two or more micro cells, or a plurality of femto or pico cells, depending on the geographic area, known obstructions and population density.

Conventional cellular networks such as LTE and LTE-A include the concept of a self organizing network (SON) which is an automated function of mounting, configuring and maintaining eNBs in a wireless communication system to lower operating and maintenance costs. One of the functionalities of SON is the automatic allocation of a physical layer cell identity (PCI). In both LTE and LTE-A, a newly added eNB into a communication network is required to allocate a unique PCI for each cell supported by the eNB to avoid interference among neighboring cells. This information is provided to the user equipment (UE) by transmitting a primary synchronization signal (PSS), a secondary synchronization signal (SSS).

There are 504 unique PCIs in LTE/LTE-A grouped into 168 physical layer cell identity groups (PCIG) (0-167), each containing 3 physical layer cell identities (PCI) (0-2). The combination of the PCIG and PCID determines the PCI of a LTE/LTE-A cell. PCID (0-2) is encoded in the PSS while the PCIG (0-167) is encoded in the SSS.

LTE/LTE-A frames contain reference signals (RS) which the UEs use to determine signal attenuation, timing adjustment and handover candidates. A RS is arranged in a specific pattern within the LTE/LTE-A resource block (RB). There are six possible patterns for the reference signals which are determined by the above described PCIG and PCID combination.

Conventionally, two automatic PCI allocation methods employing the SON method predominate, a centralized method and a distributed method. As shown in FIG. 1, the conventional centralized method employs one or more centralized operations and maintenance (OAM) function entities 24 within the element management system (EMS) 20. Each OAM function obtains PCI values from a PCI database 22. In the centralized method, during the initial configuration performed by the eNB, the OAM provides the eNB of specific PCI values which it may employ as the PCI of a new cell. Alternatively, according to the distributed method, the OAM function entity provides the eNB of a usable PCI value list. If the OAM function entity 24 does not provide a usable PCI value list then the eNB assumed a default range from which the eNB will select a PCI value). For example, as shown in FIG. 1, an eNB 60 can receive PCI values 32 transmitted from the OAM function entity 24 which obtains PCI values from a PCI database 22 within the core network 20. The eNB can determine whether neighboring cells contain similar PCI values by maintaining a neighbor relation table 34. The eNB 60 allocates PCI values to cell identifier within the Primary and Secondary Synchronization Signals used for further communicates with user equipment 50 via radio module 36.

SUMMARY

The foregoing and other problems are overcome, and other advantages are realized, by the use of the exemplary embodiments of this invention.

In a first aspect thereof the exemplary embodiments of this invention provide a method including the steps of obtaining geographical coordinates for a cell based upon the location of the cell, generating a physical layer cell identity matrix for the cell based upon a sub set of physical layer cell values allocated for the location of the cell, the generating of the physical layer cell identity matrix performed to eliminate interference among primary and secondary synchronization signaling for the cell based upon a sub set of physical layer cell values allocated for the location of the cell, using one of the physical layer cell identities contained in the generated physical layer cell matrix for the new cell which is mapped to the location of the new cell and monitoring for physical layer cell color code collisions among neighboring cells reported by one or more user equipment in range of the new cell and neighboring cells, in determining that a physical layer cell color code collision occurs re-generate a physical layer cell matrix using unallocated physical layer cell values for the location of the new cell.

In a second aspect thereof the exemplary embodiments of this invention provide an apparatus configured to obtain the geographical coordinates for a cell based upon the location of the cell, generating a physical layer cell identity matrix for the cell based upon a sub set of physical layer cell values allocated for the location of the cell, the generating of the physical layer cell identity matrix performed to eliminate interference among primary and secondary synchronization signaling for the cell based upon a sub set of physical layer cell values allocated for the location of the cell, using one of the physical layer cell identities contained in the generated physical layer cell matrix for the new cell which is mapped to the location of the new cell and monitoring for physical layer cell color code collisions among neighboring cells reported by one or more user equipment in range of the new cell and neighboring cells, in determining that a physical layer cell color code collision occurs re-generate a physical layer cell matrix using unallocated physical layer cell values for the location of the new cell.

In a third aspect thereof the exemplary embodiments of this invention provide a program storage device readable by a machine, tangibly embodying a program of instructions executable by the machine for performing operations, said operations include obtaining the geographical coordinates for a cell based upon the location of the cell, generating a physical layer cell identity matrix for the cell based upon a sub set of physical layer cell values allocated for the location of the cell, the generating of the physical layer cell identity matrix performed to eliminate interference among primary and secondary synchronization signaling for the cell based upon a sub set of physical layer cell values allocated for the location of the cell, using one of the physical layer cell identities contained in the generated physical layer cell matrix for the new cell which is mapped to the location of the new cell and monitoring for physical layer cell color code collisions among neighboring cells reported by one or more user equipment in range of the new cell and neighboring cells, in determining that a physical layer cell color code collision occurs re-generate a physical layer cell matrix using unallocated physical layer cell values for the location of the new cell.

BRIEF DESCRIPTION OF THE DRAWINGS

The following discussion of the exemplary embodiments of this invention is made more evident in the following Detailed Description, when read in conjunction with the attached Drawing Figures, wherein:

FIG. 6(a) is an illustration of PCI values assigned in various ranges and in different size matrixes according to exemplary embodiments of the invention;

FIG. 6(c) is an illustration of four 6×6 PCI matrixes in the range of [150, 191] which adhere to constraints allowing continuous coverage of large geographic location according to exemplary embodiments of the invention;

FIG. 7(a) is an illustration of generation of various size PCI matrixes depicting MOD 3 and MOD 6 properties according to exemplary embodiments of the invention;

FIG. 7(c) is an illustration of generation of a 12×12 matrix depicting MOD 6 properties which adhere to constraints allowing continuous coverage of large geographic location according to exemplary embodiments of the invention.

DETAILED DESCRIPTION

The exemplary embodiments of this invention provide apparatuses methods, and computer program(s) for allocating physical cell identity (PCI) value to LTE cells based upon a cell geographical location. The exemplary embodiments disclosed herein: significantly minimizes PCI collisions, eliminate dependency on a central entity (i.e., EMS) and improve cell availability. Benefits also include improved UE performance and battery life, as well as reduced instances of hand-off failures.

In addition, exemplary embodiments of the invention disclose an approach that minimizes interference due to neighboring cells whose PCI values have the same MOD 3 offset. In addition, exemplary embodiments of the invention eliminate interference due to neighboring cells whose PCI values have the same MOD 6 offset. "MOD" or module used throughout this disclosure refers to a modulus operator (%) which performs a modulus function and returns a remainder In one or more exemplary embodiments of the invention the method or computer operations disclosed herein are implemented in an eNB, a home eNB (HeNB) macro, micro, pico or femto eNB as part of SON function implemented in the eNB.

Figure 2:
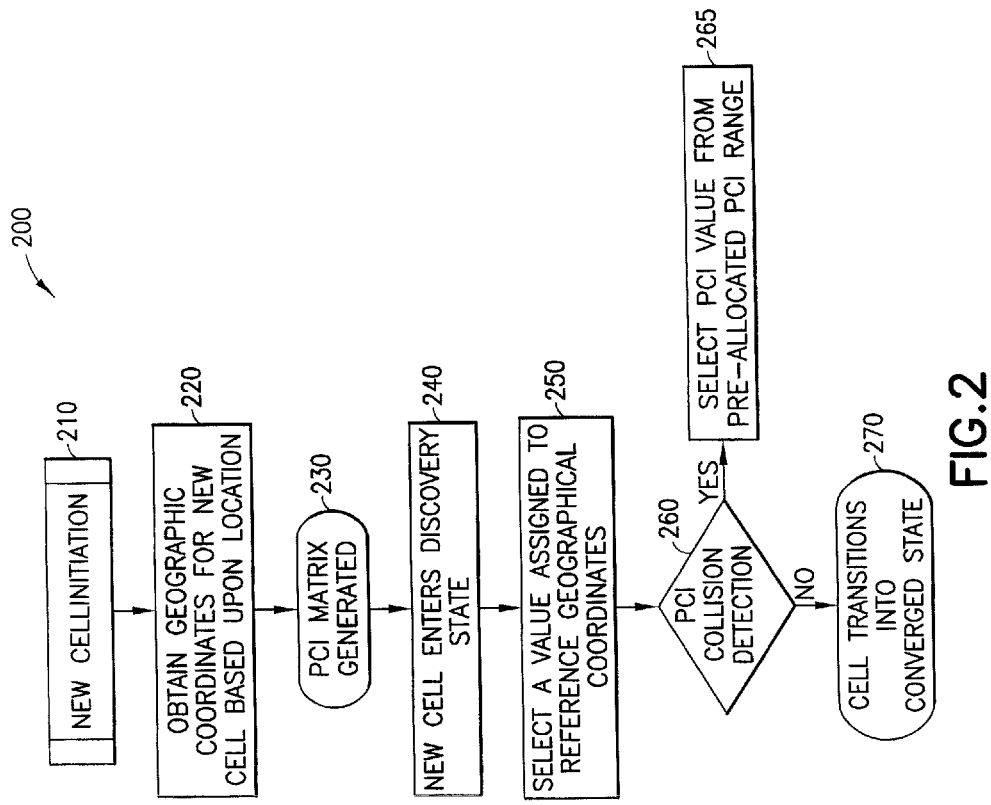
FIG. 2 is a logical flow diagram detailing various exemplary methods and computer programs that are suitable for use in practicing the exemplary embodiments of this invention.

Referring now to FIG. 2, a logical flow diagram is provided 200 detailing various exemplary methods and computer programs that are suitable for use in practicing the exemplary embodiments of this invention. As shown in FIG. 2, a new cell is initiated 210 which occurs when a network operator implements a new cell which can be a macro, micro, pico or femto cell. Prior to the new cell coming into service, the cell uses a GPS module (shown in FIG. 8) to obtain the geographical coordinates 220 of the location where the cell will be implemented. In the case where GPS is not available for example, in an indoor deployment, the network operator obtains the geographical coordinates 220 of the location where the cell will be implemented. The specific location of the cell can be a slide length of 10 kilometers, 1 kilometer, 100 meters, or 1 meter according to the military grid reference system (MGRS). Grids are normalized using the Universal Transverse Mercator Projection.

It is desirable in exemplary embodiments of the invention to have the entire Earth's global geographical coordinates normalized to regions referenced by specific global position satellite (GPS) coordinates and as a result flatting the entire globe. Then the geographical coordinates are further normalized by mapping to the generated matrix. This is achieved by replicating the matrix to cover the entire geographical location of interest. That way no centralized database needs to be maintained. Instead, each cell coming into service can independently determine the appropriate PCI values to assign. In one exemplary embodiment of the invention, a local database can be maintained in an eNB, where the database contains the entire Earth's global geographical coordinates normalized to the specific global position satellite (GPS) coordinates (i.e., the X, Y coordinates) and mapped to predetermined PCI values. In this embodiment, an eNB coming into service looks up the appropriate usable PCI values by accessing a database which contains a static list of available PCI values associated with geographical coordinates.

In another exemplary embodiment of the present invention PCI values are dynamically mapped via a latitude/longitude distance approach to generate a PCI matrix 230. In this embodiment, a PCI matrix is dynamically designed and generated to covers a geographical range for any new cell coming into service. For example, a 12×12 PCI matrix can be designed and generated on the fly to cover a specific geographic range of 100 meters which would cover a 14.4 kilometers square area (12×12×100 m=14.4 km). Alternatively, the matrix can be 6×6 or 10×10. A starting reference point is designated as "A longitude" and "B latitude", where the new cell in this matrix covers the 100 m square range. In this example, it is assumed that A longitude is equal to 0, and B latitude is equal to 0 and derive an eNB' location X longitude and location Y latitude based upon that assumption. X longitude and Y latitude are then normalized with X longitude MODULUS 12×100 m=X' and Y latitude MODULUS 12×100 m=Y'. Then, the normalized X' longitude and Y' latitude geographic location of the new cell falls in one of the cell in the matrix. As a result PCI value is determined.

To further illustrate this embodiment, a cell initializing in Chicago, Ill. in the United States would normalize to the eNB cell's GPS coordinates 41°52'55"N, 87°37'40"W to X',Y' and then map X',Y' to one of the cells in the matrix and obtain the associated PCI value. Note that a cell in the matrix represents square meters based on eNB type. For example, a Macro cell will be defaulted to 10 km square area and Pico cell will be defaulted to 100 m square area with the operator having the option to customize/change the square area coverage defined per cell.

After the geographical coordinates are determined, a matrix can be populated with any PCI values between 1 and 503, or a subset of those PCI values following the constraint rules set forth below.

Next, the new cell is placed "on air" in the network and enters a learning (discovery) state 240. During the discovery state, the new cell learns of the neighboring PCI allocations. The period of time in which the new cell is in the discovery state can vary from seven days to one month. The discovery state allows the new cell to determine whether other visible cells reported by the UE are employing the same PCI values or PCI values resulting in color code conflict. A long discovery periods addresses the case where other neighboring cells operating near the new cell might not transmit on a regular basis (only during business hours during weekdays), or a neighboring cell may be down for maintenance for several days, etc.

During the discovery state, the new cell allocates PCI values 250 based on the specific geographical coordinates. The eNB monitors for collision/conflict 260 based on UE reported neighboring cells PCI values. If a PCI collision/conflict is not detected 270, the cell transitions to a learned (converged) state. In other words, the cell is no longer in discovery state and acting upon UE reported PCI values of neighboring cells. Alternatively, if a PCI collision/conflict is detected 265, a new PCI value is selected from another pre-allocated PCI range. As mentioned above, PCI values can be allocated from a sub set of the 503 available PCI values. For example, the PCI 12×12 matrix which encountered a PCI collision could be located at a range of [0, 143]. A new PCI 6×6 matrix can be generated from the unused PCI range of [144, 180] or any other unused PCI range of [181, 503].

Optionally, exemplary embodiments of the present invention include a conflict resolution method among neighboring cells within the step of PCI collision/conflict detection 260 (detected same PCI value or color code used between immediate neighbors). For example, if one cell in discovery state is in conflict with a cell in converged state the cell in discovery state changes before cell in converged state. Moreover, the cell in discovery state uses a shorter wait time (range within 2 hrs for example) before changing its PCI value. The cell in converged state uses longer wait times (range between 24 to 48 hr for example) before changing its PCI value.

If two cells are in discovery states and are in conflict each cell randomly selects wait time range within 2 hr (for example) before changing its PCI value. The cell that has been in the network longer will wait longer.

If two cells are in converged states and are in conflict each cell randomly selects wait time range within 24 hr to 48 hrs (for example) before changing its PCI value. The cell that has been in the network longer will wait longer.

Figure 1:
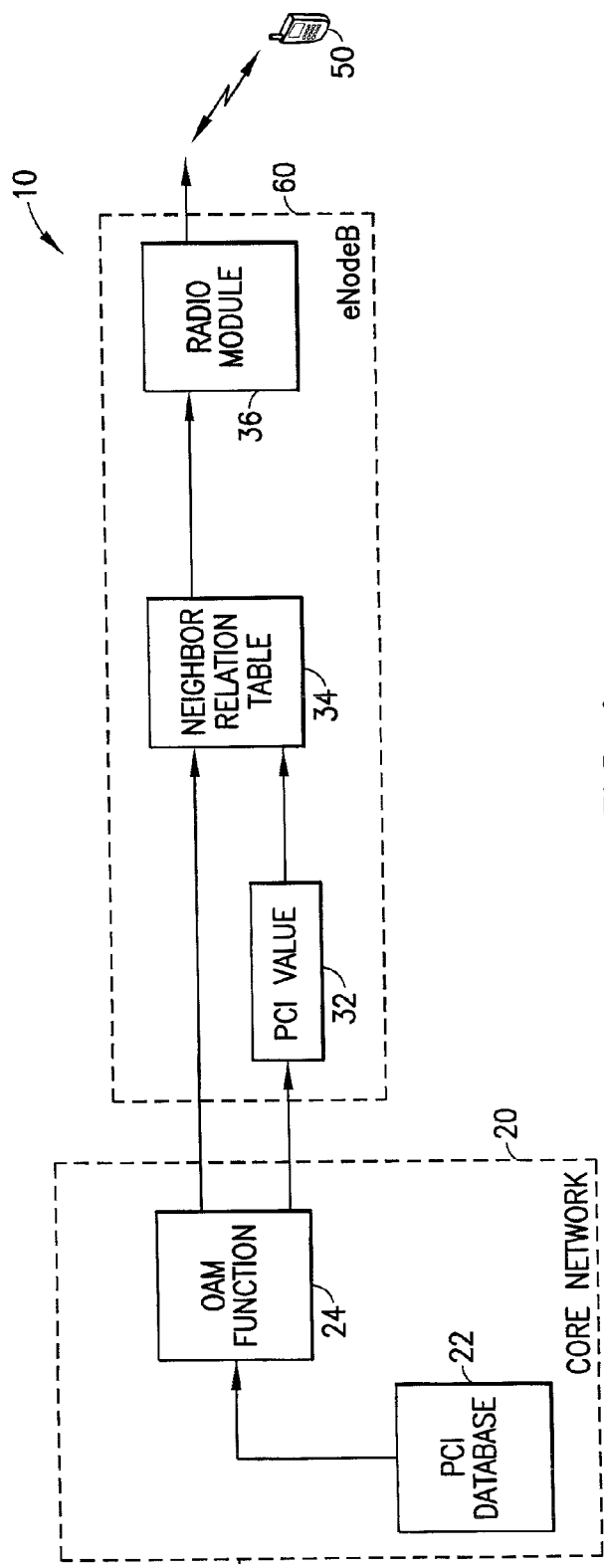
FIG. 1 is a block diagram of the conventional method of allocating PCI values employing one or more centralized operations and maintenance (OAM) functions.
Figure 3:
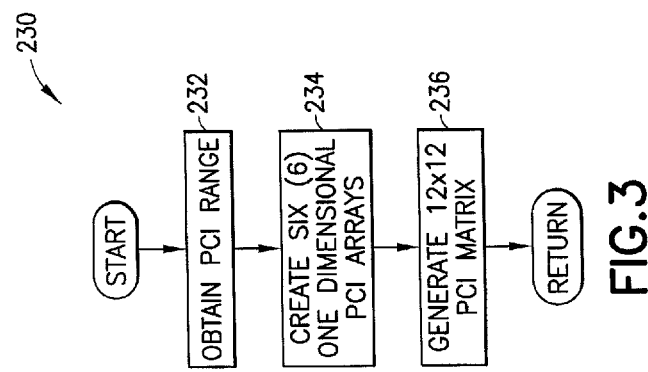
FIG. 3 is a logical flow diagram of a method step or computer executed sub-routine for generating the PCI matrix shown in FIG. 2 according to exemplary embodiments of the invention.

Referring now to FIG. 3, a logical flow diagram of the method step or computer executed sub-routine for generating a PCI matrix 230 is shown in FIG. 2 according to exemplary embodiments of the invention. In the first step or computer operation, a PCI range is obtained from the available 504 unique PCIs in LTE. If this range is not defined then a default range of [0, 180] is used.

Next six one dimensional PCI arrays are created 234. Each MOD 6 array contains an array-0 with values satisfying MOD 6=0, array-1 with values satisfying MOD 6=1, array-2 with values satisfying MOD 6=2, array-3 with values satisfying MOD 6=3, array-4 with values satisfying MOD 6=4, array-5 with values satisfying MOD 6=5. The six color codes assigned to MOD 6 take advantage of the fact that LTE physical frames contain reference signals which have six possible patterns. An alternative embodiment can assign three color codes to MOD 3 which take advantage of the fact that PCI identities contain 3 identifies 0-2.

Figure 4:
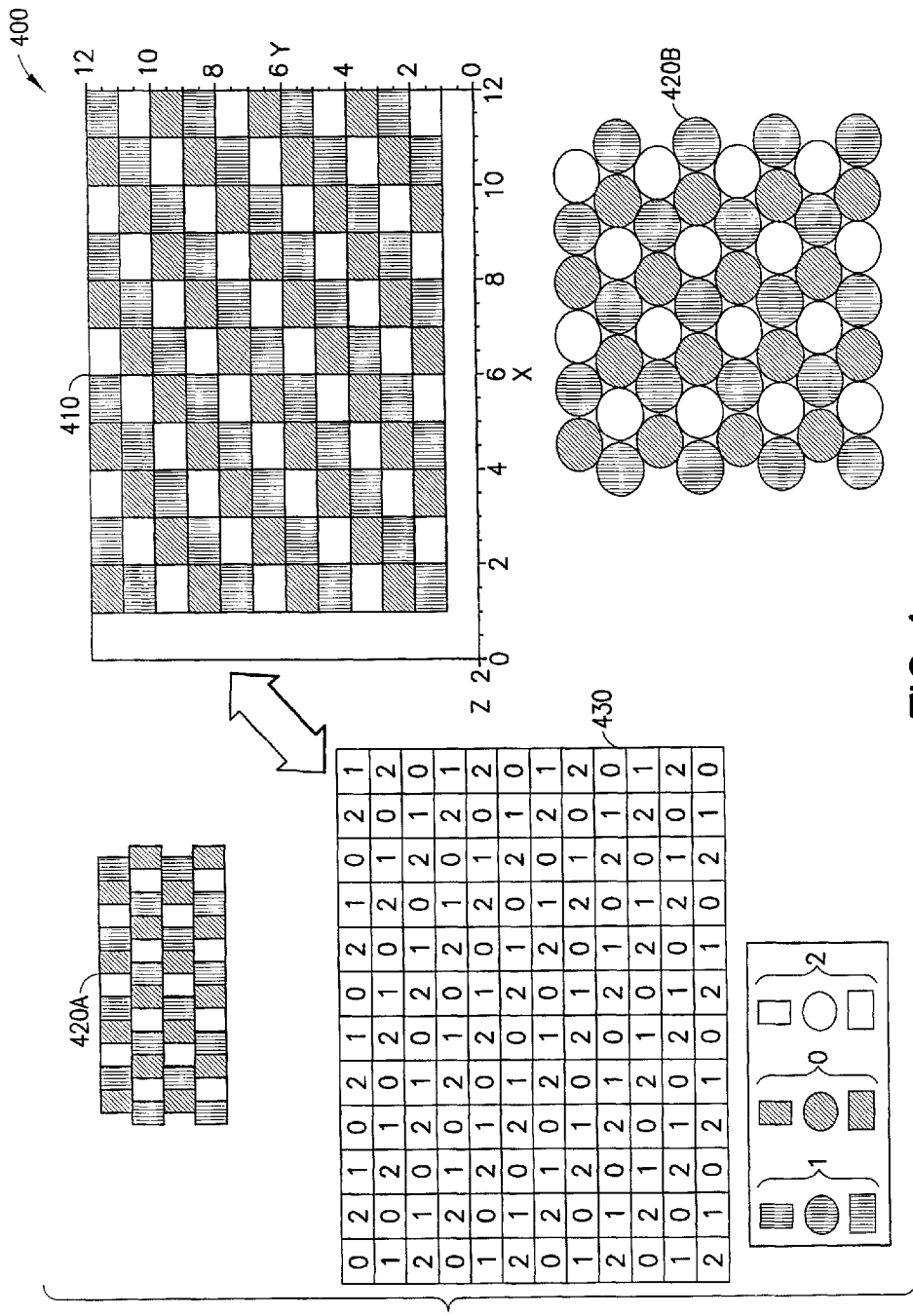
FIG. 4 is an illustration of the generation of a 12×12 PCI matrix with MOD 3 shifting properties according to exemplary embodiments of the invention.

A array can be generated which can be 6×6, 10×10 or 12×12 (or any number where N can be any integer with a preference of being divisible by 12) and populated with color coding to represent PCI values 234. For example, FIG. 4 illustrates the generation of a MOD 3 12×12 array 400. In FIG. 4, the resulting array can be color coded using three colors (shown as 0=blue, 1=black, and yellow=2) representing specific frequency spectrum allocated to each PCI value 410. The color coded values can be shifted 420A to eliminate MOD 3 interference (i.e., rows shifted by a half block). As can be seen by comparing the original MOD 3 matrix 410 to the shift MOD 3 matrixes 420A/420B a resulting array 430 shows that each color coded frequency spectrum is isolated by at least two blocks.

Figure 5:
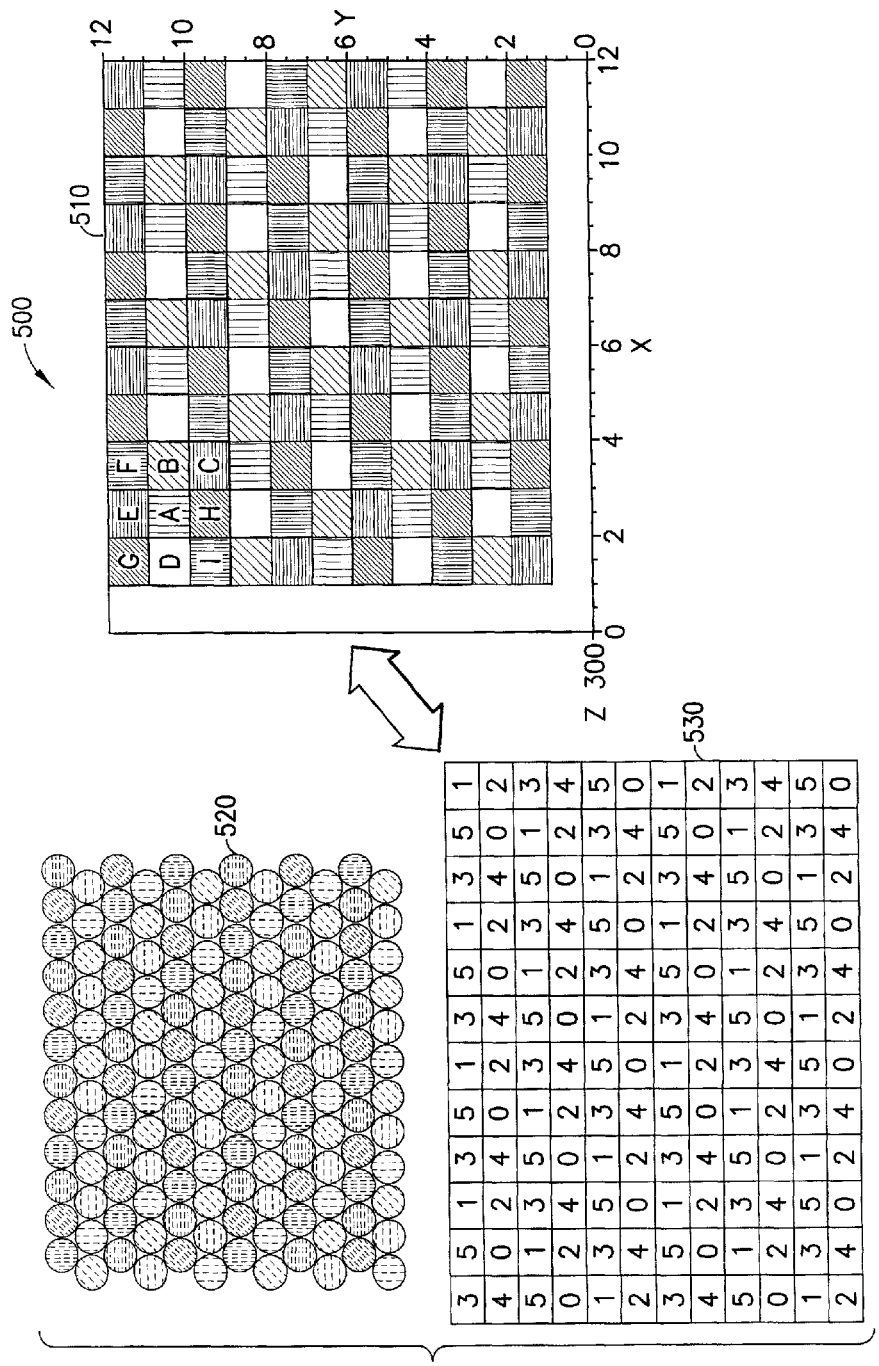
FIG. 5 is an illustration of the generation of a 12×12 PCI matrix with MOD 6 shifting properties according to exemplary embodiments of the invention.

Another example, shown in FIG. 5, is an illustration of the generation of a MOD 6 12×12 array 500. Similarly, like the MOD 3 array, the resulting array can be color coded using six colors representing specific frequency spectrum allocated to each PCI value 510. As shown in FIG. 5, "A" which is allocated green has immediate neighbors B (brown), C (red), D (black), E (brown), F (tan), G (yellow), H (yellow) and I (tan). A row shift can be employed to eliminate the MOD 6 interference. A resulting array 530 shows that each color coded frequency spectrum is isolated by at least two blocks (i.e. first row 3 is isolated by two blocks).

It is desirable to enforce various constraints to prevent reuse of PCI values according to exemplary embodiments of the invention. For example, PCI values can be pre-allocated in a range of [0, 167]. Accordingly, PCI values in the range of [167, 503] are not used. Six color codes can be defined for MOD 6 based on:

Code 1: {('X' MOD 6)==0} && {(X MOD 3)==0)}
Code 2: {('X' MOD 6)==3} && {(X MOD 3)==0)}
Code 3: {('X' MOD 6)==1} && {(X MOD 3)==1)}
Code 4: {('X' MOD 6)==4} && {(X MOD 3)==1)}
Code 5: {('X' MOD 6)==2} && {(X MOD 3)==2)}
Code 6: {('X' MOD 6)==5} && {(X MOD 3)==2)}

Further constraints can be applied to immediate neighbors, such that PCI values cannot be assigned the same color code such that Code 1 & Code 2 cannot touch each other,
Code 3 & Code 4 cannot touch each other,
Code 5 & Code 6 cannot touch each other.

FIG. 6(a) illustrates PCI values assigned in various ranges and in different size matrixes 600. For example, a 6×6 matrix can be generated in the range of [150, 185] 610. Alternatively, a 10×10 matrix can be generated in the range of [0, 122] 620. Another PCI matrix can be generated in the range of [0, 149] and in a 12×12 matrix.

Figure 6B:
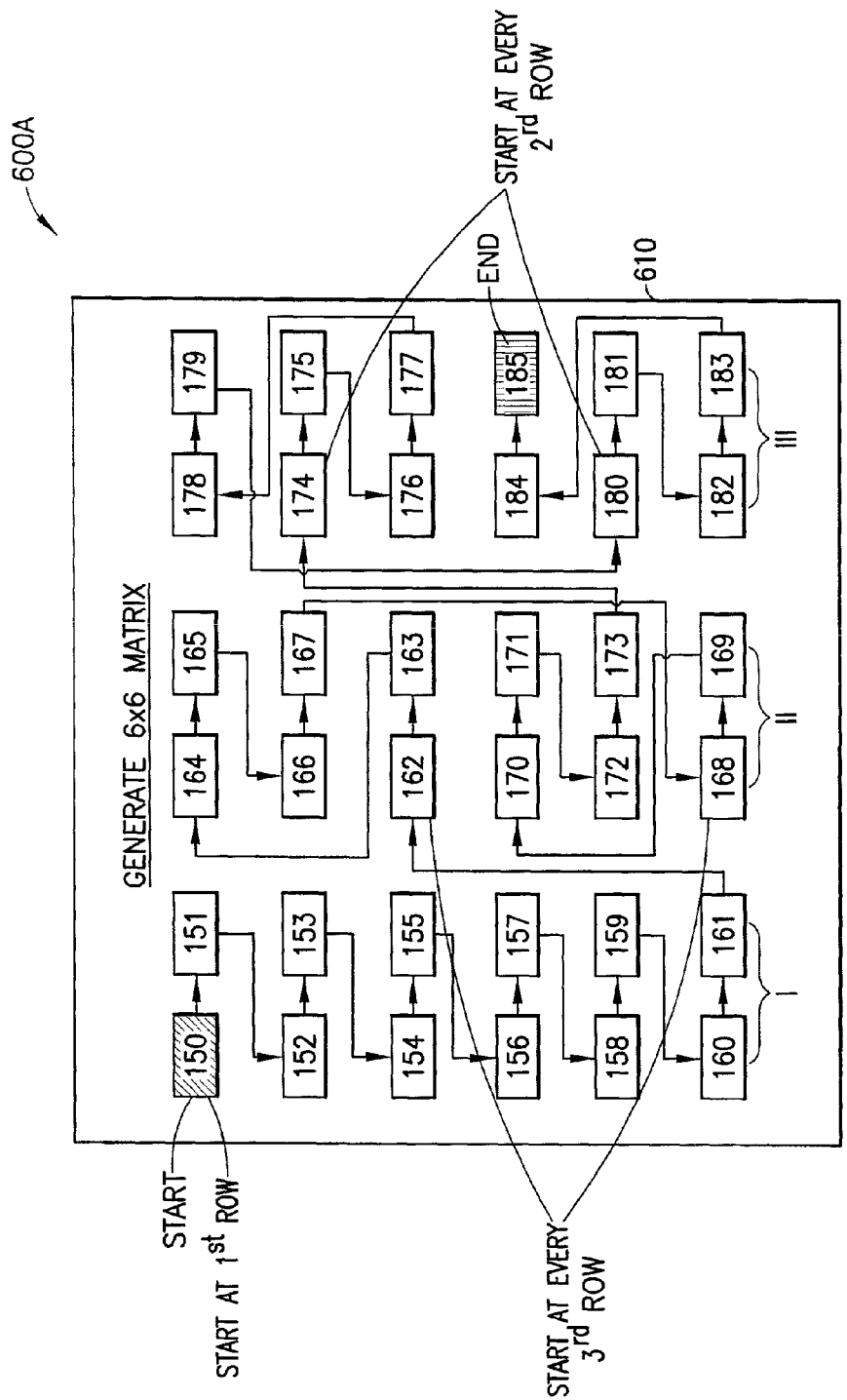
FIG. 6(b) is an illustration one possible organization of a 6×6 matrix in the range of [150, 191] according to exemplary embodiments of the invention to achieve desired MOD3 and MOD6 properties between neighboring PCI values in the matrix.

Referring now to FIG. 6(b) an illustration of a non-limiting example of the generation of a 6×6 matrix is shown. It this example the usable PCI range is [150, 185]. The six arrays generated are:

(Array 1) Code 1: 150, 156, 162, 168, 174, 180
(Array 2) Code 2: 151, 157, 163, 169, 175, 181
(Array 3) Code 3: 152, 158, 164, 170, 176, 182
(Array 4) Code 4: 153, 159, 165, 171, 177, 183
(Array 5) Code 5: 154, 160, 166, 172, 178, 184
(Array 6) Code 6: 155, 161, 167, 173, 179, 185

As shown in FIG. 6(b), the 6×6 the matrix is populated by means of a rotational shift technique beginning with the first two column pairs (I) which are filled according to the constrain rules. As such, applying the constrain rules color code 1 is inserted into the matrix (150) followed downward by color code 2 (151), color code 3 (152), color code 4 (153), color code 5 (154) and color code 6 (155). The next column pair (II) is populated starting at the third row (a two row shift) and moving upward. After iterating upward through the color code sequence 1, 3, 5, 2, 4, 6 the column pair is populated downward through another color code sequence 1, 3, 5, 2, 4, 6. The next column (III) is populated starting at the second row (a one row shift) then down one row then concluding the first sequence of the color code sequence 1, 3, 5, 2, 4, 6. The second to last rows of column III are then populated followed by a one row shift. Accordingly, the 6×6 matrix complies with the color code constrains whereby the immediate neighbors do not have color codes 1 and 2, 3 and 4 and 5 and 6. The method of allocating PCI values is not limited to the above, for example, in FIG. 6(a) an alternate method is employed achieving the same desired MOD 3 and MOD 6 end result in 10×10 or 12×12 matrixes.

Figure 6C:
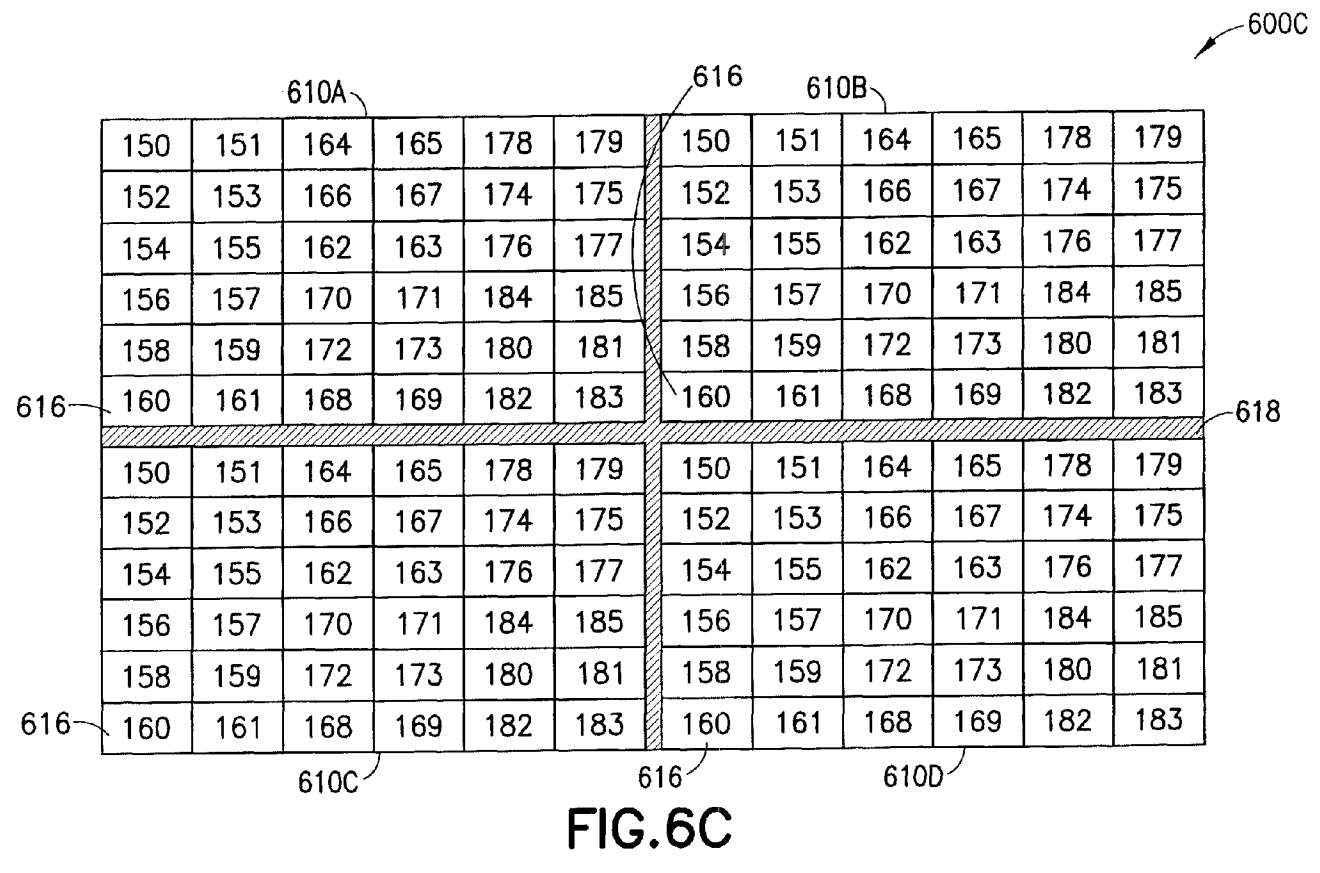
Figure 7A:
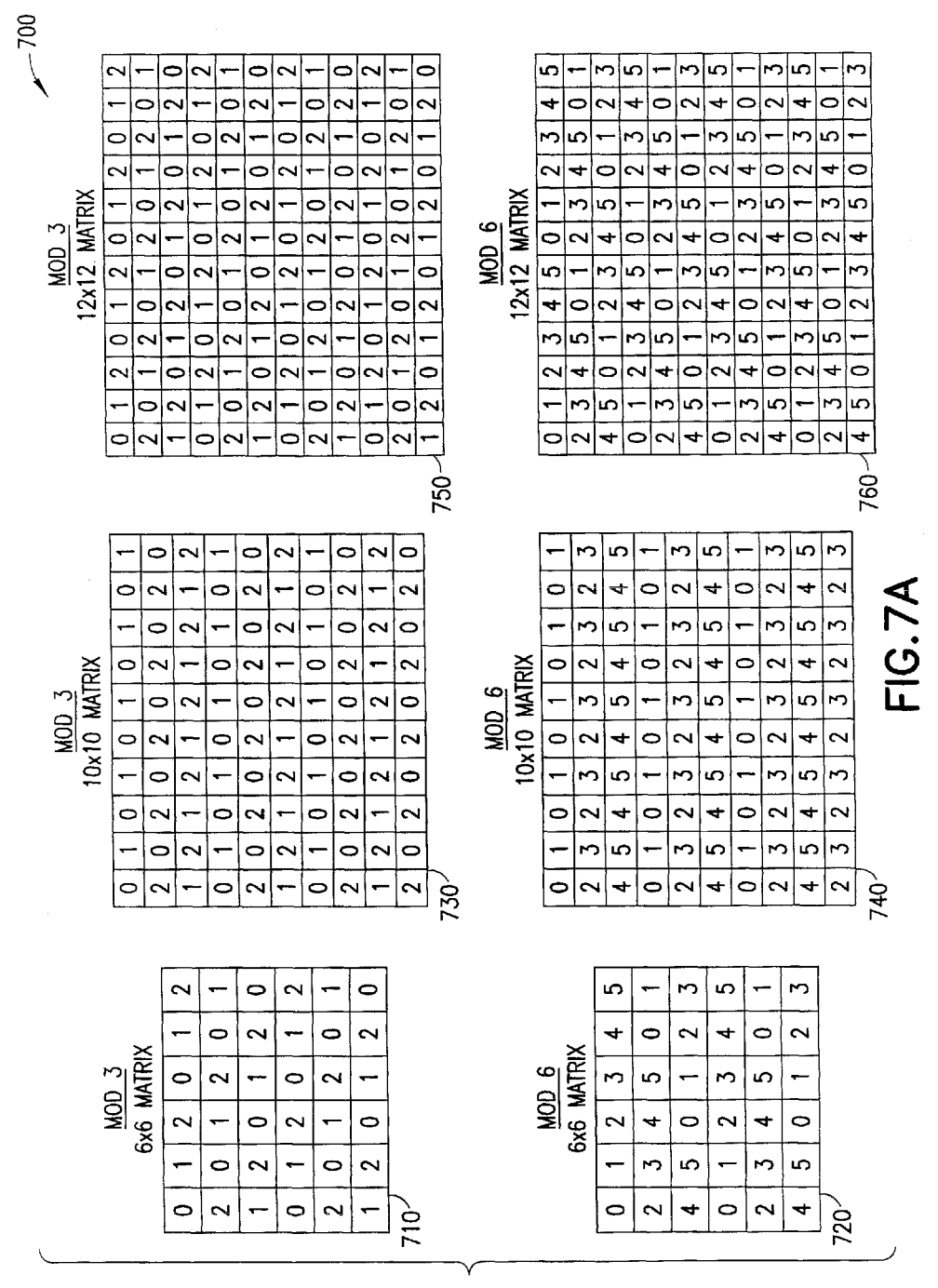

FIG. 6(c) is an illustration of the four 6×6 PCI matrix in the range of [150, 185] which adhere to the above described constraints 600C. As shown in FIG. 6(c), four 6×6 PCI matrixes 610A, 610B, 610C and 610D are arranged such that the borders 618 do not allow for similar PCI values to touch. For example PCI value 160 (616) reoccurs in each matrix yet does not touch or cause interference with its neighbor. Referring now to FIG. 7(a) an illustration of various color coding applied to MOD 3 and MOD 6 are shown 700. As shown in FIG. 7(a), a 6×6 MOD 3 matrix 710, a 10×10 MOD 3 matrix 730, and a 12×12 MOD 3 matrix 750 are shown. Also shown in FIG. 7(a) is, a 6×6 MOD 6 matrix 720, a 10×10 MOD 6 matrix 740, and a 12×12 MOD 6 matrix 760.

Figure 7B:
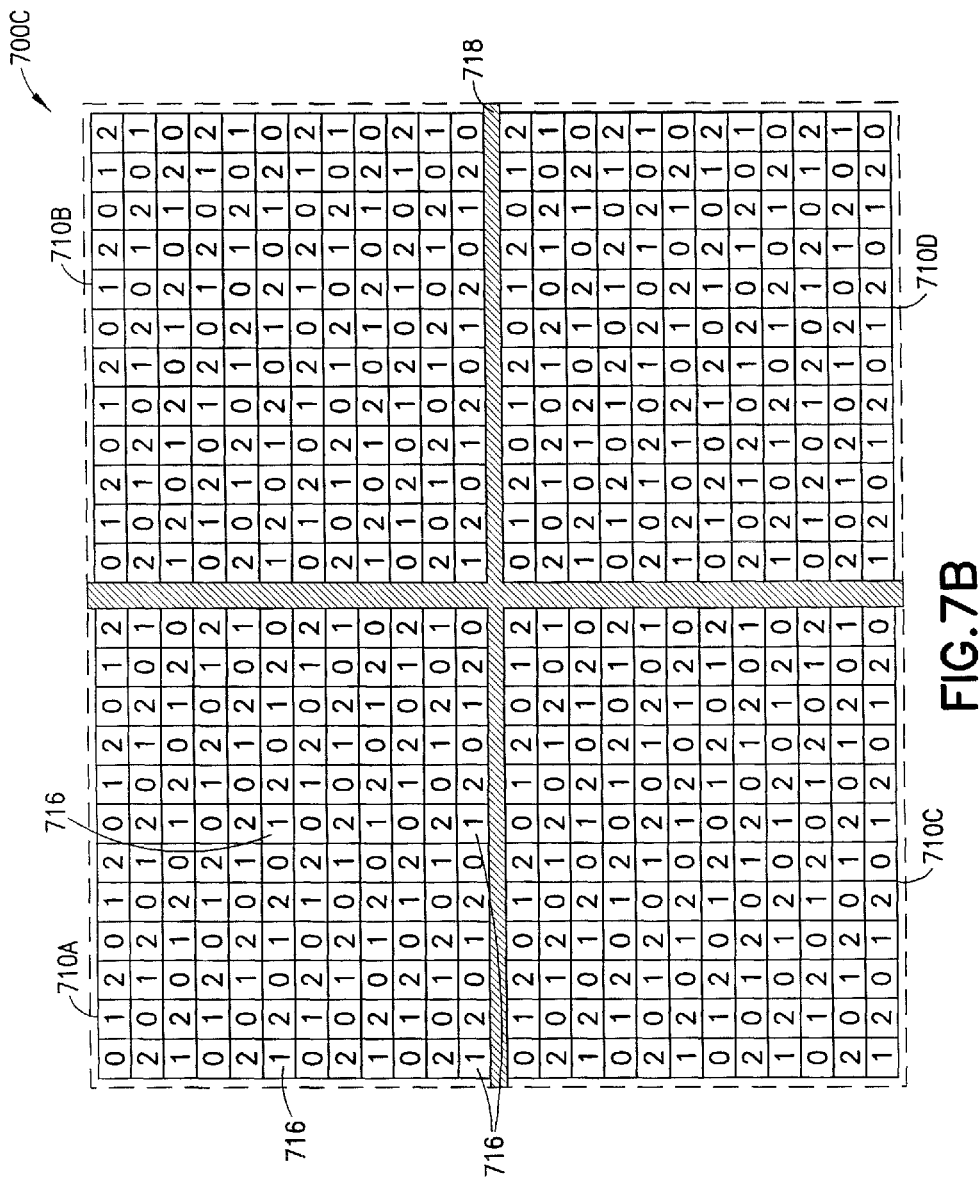
FIG. 7(b) is an illustration of generation of a 12×12 matrix depicting MOD 3 properties which adhere to constraints allowing continuous coverage of large geographic location according to exemplary embodiments of the invention.

FIG. 7(b) is an illustration of how desired MOD 3 properties are preserved across border between quadrant one 710A, quadrant two 710B, quadrant three 710C, quadrant four 710D.

Figure 7C:
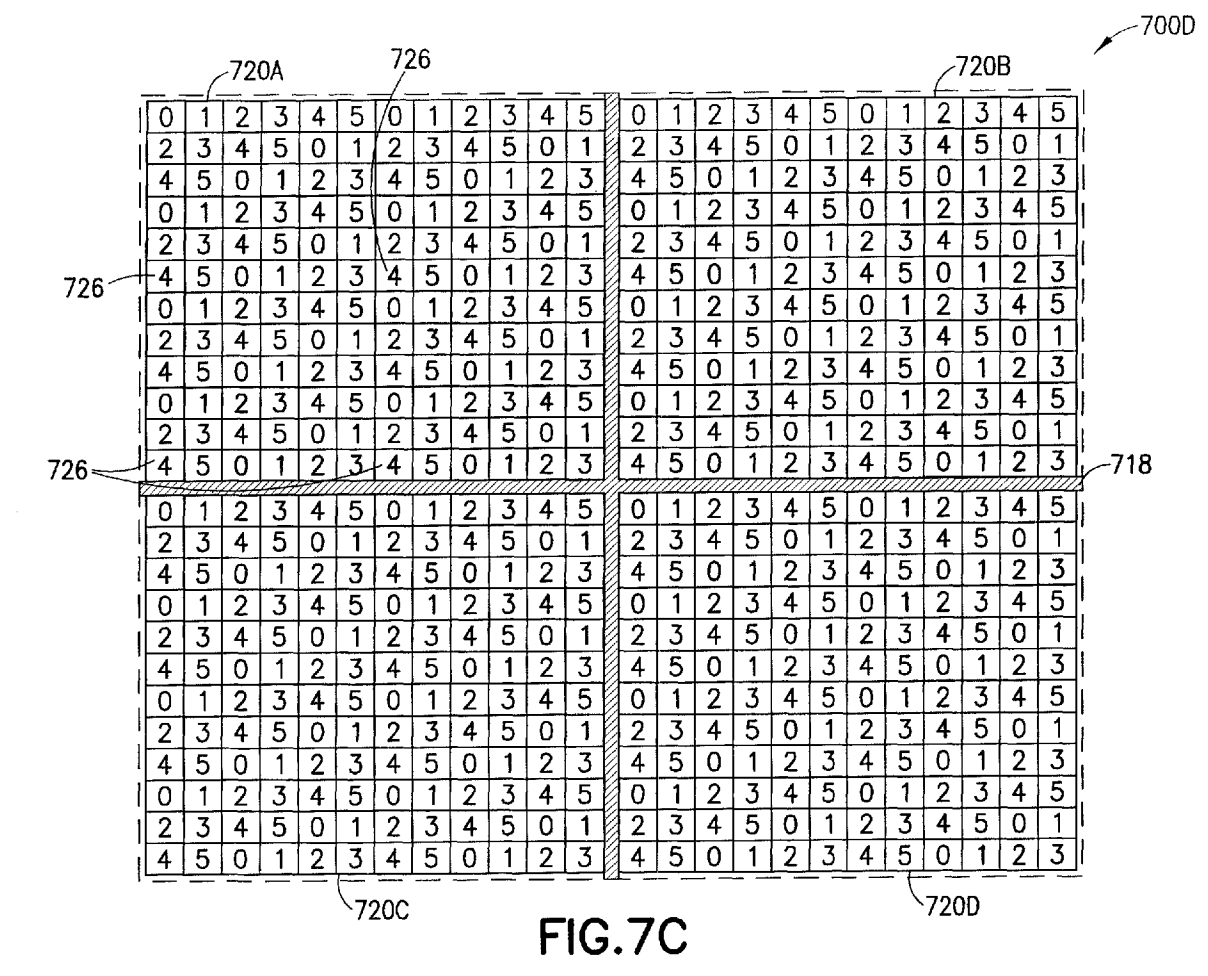

FIG. 7(c) is an illustration of how desired MOD 6 properties are preserved across border between quadrant one 720A, quadrant two 720B, quadrant three 720C, and quadrant four 720D.

Figure 8:
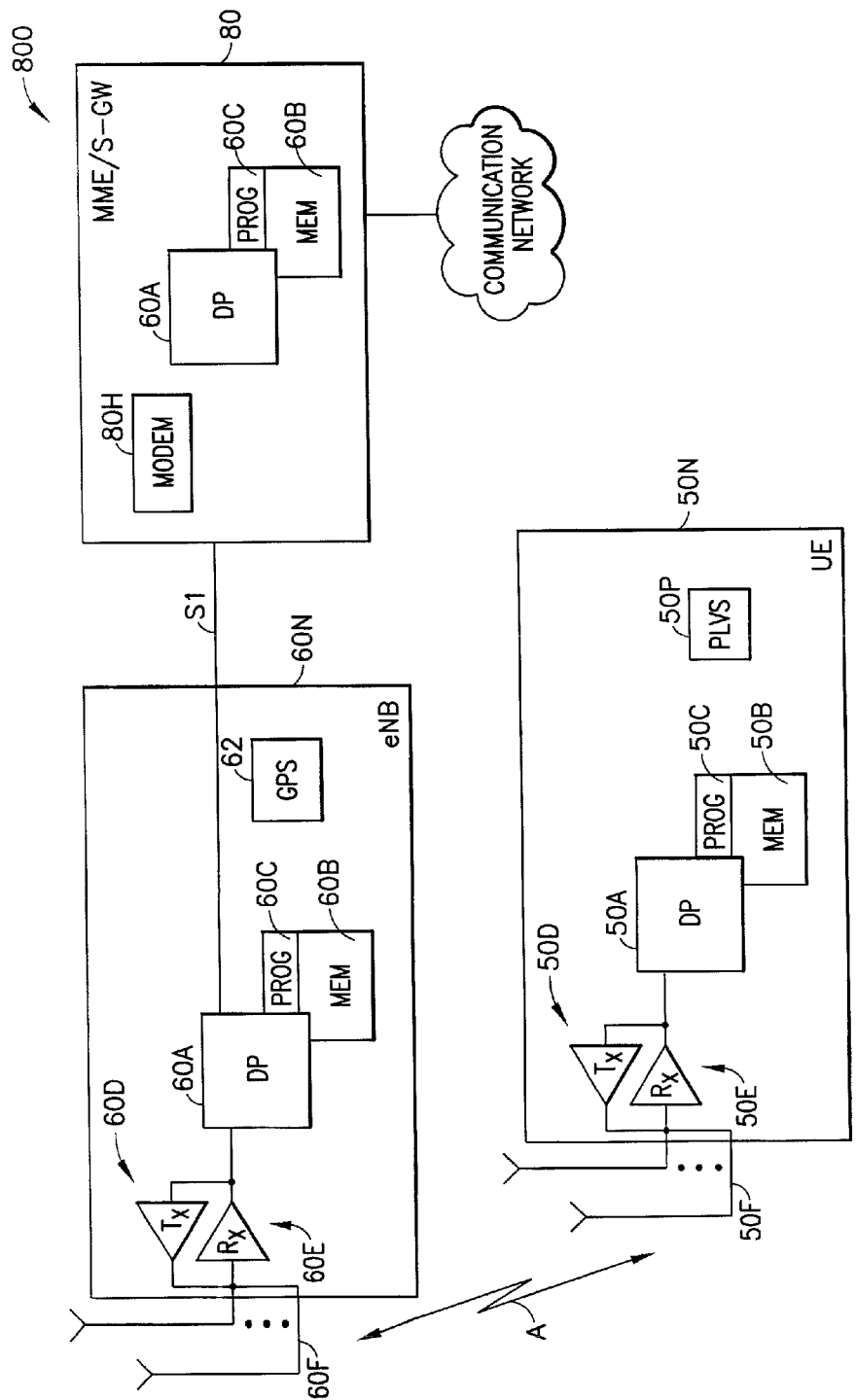
FIG. 8 is a simplified block diagram of various electronic devices and apparatuses that are suitable for use in practicing the exemplary embodiments of this invention.

Reference is now made to FIG. 8 for illustrating a simplified block diagram of various electronic devices and apparatuses 800 that are suitable for use in practicing the exemplary embodiments of this invention. In FIG. 8, a first access node 60N is adapted for communication over a wireless link A with a mobile apparatus, such as a mobile terminal or UE 50n. The first access node 60N may be a macro eNodeB, a femto eNodeB, or other type of base station (BS) or access point (AP).

For completeness, the UE 50N includes processing means such as at least one data processor (DP) 50A, a storing means such as at least one computer-readable memory (MEM) 50B storing at least one computer program (PROG) 50C, and also a communicating means such as a transmitter TX 50D and a receiver RX 50E for bidirectional wireless communications with the first access node 50 via one or more antennas 50F. UE 50N includes at least one of the PROGs 50C to allow the UE to employ a power level variation sensor 50P to carry out the above described methods and computer program operations to allocate physical cell identity (PCI) values to LTE cells based upon a cell's geographical location.

The first access node 60N similarly includes processing means such as at least one data processor (DP) 60A, storing means such as at least one computer-readable memory (MEM) 60B storing at least one computer program (PROG) 60C, and communicating means such as a transmitter TX 60D and a receiver RX 60E for bidirectional wireless communications with the UE 60 via one or more antennas 60F. First access node 60 also includes at least one of the PROGs 60C to allow it to employ a GPS module 62 to carry out the above described methods and computer program operations to allocate physical cell identity (PCI) values to LTE cells based upon a cell's geographical location in according with one or more embodiments of the present invention. Also as shown in FIG. 10 a data and/or control path S1 couples the first access node 60N with a MME/S-GW 80.

MME/S-GW 80 includes processing means such as at least one data processor (DP) 80A, a storing means, such as at least one computer-readable memory (MEM) 80B storing at least one computer program (PROG) 80C, and a communicating means, such as a modem 8011 for bidirectional communication with the first access node 60N via the link S1. While not particularly illustrated for the UE 50N or first access node 60N, those devices are also assumed to include as part of their wireless communicating means a modem which may be inbuilt on a radiofrequency RF front end chip within those devices 60F, 50F, 80H and which chip also carries the TX 60D/50D and the RX 60E/50E. The MME/S-GW 80 also has stored in its local memory at 80B the database which it constructs and maintains as detailed above and listing the available PCI values and geographical location of the cell.

At least one of the PROGs 60C in the eNB 60N is assumed to include program instructions that, when executed by the associated DP 60A, enable the device to operate in accordance with the exemplary embodiments of this invention, as detailed above. In particular, to allow the eNB 60N to operate in conjunction with GPS module 62 to generate PCI values and allocate a matrix specific to the geographic location in according with one or more embodiments of the present invention.

In these regards, the exemplary embodiments of this invention may be implemented at least in part by computer software stored on the MEM 60B, which is executable by the DP 60A of the eNB 60N or by hardware, or by a combination of tangibly stored software and hardware (and tangibly stored firmware). Electronic devices implementing these aspects of the invention need not be the entire devices as depicted at FIG. 10, but exemplary embodiments may be implemented by one or more components of same such as the above described tangibly stored software, hardware, firmware and DP, or a system on a chip SOC or an application specific integrated circuit ASIC. The above described methods and computer programs can run on any external device that can communicate with the eNB such non-limiting examples are a user equipment such as a cellular phone, smart phone, tablet or personal computer.

Various embodiments of the computer readable MEMs 60B, 50B, 80B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 80A, 80A and 80A include, but are not limited to, general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   obtaining, by a base station in a communication network, geographical coordinates for a cell based upon the location of the cell;
   generating, by the base station, an initial physical layer cell identity (PCI) matrix for the cell based upon a sub set of physical layer cell values allocated for the location of the cell,
   wherein generating the initial physical layer cell identity matrix comprises:
      creating arrays corresponding to a particular modulus combination pair;
      assigning codes for each of the arrays; and
      assigning physical layer cell values to each coded array; and
   wherein the generating of the initial physical layer cell identity matrix is performed to eliminate interference among primary and secondary synchronization signaling for the cell based upon a sub set of physical layer cell values allocated for the location of the cell;
   using one of the physical layer cell values contained in the generated initial physical layer cell matrix for a new cell, wherein the generated initial physical layer cell matrix is mapped to the location of the new cell; and
   monitoring for physical layer cell color code collisions among neighboring cells reported by one or more user equipment in range of the new cell and neighboring cells,
   wherein when a physical layer cell color code collision occurs, generating a consequent physical layer cell matrix using unallocated physical layer cell values for the location of the new cell.

2. The method of claim 1, further comprising the step of:
   superimposing the generated initial physical layer cell identity matrix to the geographical region where the new cell is located.

3. The method of claim 1, further comprising the step of:
   allocating one of the physical layer cell values from the generated consequent physical layer cell matrix to resolve the physical layer cell color code collision.

4. The method of claim 1, where wherein in generating the initial physical layer cell identity matrix:
   the arrays created are six in number;
   the particular modulus combination pair is a MOD 3 and MOD 6 combination pair; and
   the assigned codes for each of the arrays are color codes.

5. The method of claim 2, where color codes comprise:
   a first code where {(PCI MOD 6)==0} && {(PCI MOD 3)==0)};
   a second code where {(PCI MOD 6)==3} && {(PCI MOD 3)==0)};
   a third code where {(PCI MOD 6)==1} && {(PCI MOD 3)==1)};
   a fourth code where {(PCI MOD 6)==4} && {(PCI MOD 3)==1)};
   a fifth code where {(PCI MOD 6)==2} && {(PCI MOD 3)==2)}; and
   a sixth code where {(PCI MOD 6)==5} && {(PCI MOD 3)==2)}, and
   where PCI represents a physical cell identity value.

6. The method of claim 5, where the first code and second code cannot touch each other, the third code and fourth code cannot touch each ether other, and the fifth and sixth code cannot touch each other.

7. The method of claim 3, where the new cell transitions to a learned state after a period of time which can span one to thirty-one days without detecting a PCI color code collision.

8. The method of claim 6, where the step of monitoring collisions further comprises:
   resolving color code collisions among one or more cells that are in a learning state and learned states.

9. The method of claim 6, further comprising determining that the new cell is in a learning state is in conflict with a cell in a learned state, the new cell in the learning state reallocates PCI values from a range of unused PCI values, wherein the range having a color code that is unused by its neighbors, wherein the new cell in the learning state uses shorter wait times before changing its PCI value than the longer wait times in the learned state.

10. The method of claim 6, further comprising determining that two cells are in learning states are in conflict and triggering each cell of the two cells to randomly select a wait time range before changing its PCI value, wherein the cell of the two cells that has been in the network longer will wait longer.

11. The method of claim 6, further comprising that two cells are in learned states are in conflict and each cell of the two cells randomly selects a wait time ranging within 24 to 48 hours before changing its PCI value, wherein the cell of the two cells that has been in the network longer will wait longer.

12. An apparatus, comprising:
   at least one processor; and
   at least one memory storing a computer program;
   in which the at least one memory with the computer program is configured with the at least one processor to cause the apparatus to at least perform or control:
      obtaining geographical coordinates for a cell based upon the location of the cell;
      generating an initial physical layer cell identity (PCI) matrix for the cell based upon a sub set of physical layer cell values allocated for the location of the cell,
      wherein generating the initial physical layer cell identity matrix comprises:
         creating arrays corresponding to a particular modulus combination pair;
         assigning codes for each of the arrays; and
         assigning physical layer cell values to each coded array; and
      wherein the generating of the initial physical layer cell identity matrix is performed to eliminate interference among primary and secondary synchronization signaling for the cell based upon a sub set of physical layer cell values allocated for the location of the cell;
      using one of the physical layer cell values contained in the generated initial physical layer cell matrix for a new cell, wherein the generated initial physical layer cell matrix is mapped to the location of the new cell; and monitoring for physical layer cell color code collisions among neighboring cells reported by one or more user equipment in range of the new cell and neighboring cells, wherein when a physical layer cell color code collision occurs, generating a consequent physical layer cell matrix using unallocated physical layer cell values for the location of the new cell.

13. The apparatus of claim 12, where the at least one memory with the computer program is further configured, with the at least one processor, to cause the apparatus to at least perform or control superimposing the generated initial physical layer cell identity matrix to the geographical region where the new cell is located.

14. The apparatus of claim 12, where the at least one memory with the computer program is further configured, with the at least one processor, to cause the apparatus to at least perform or control allocating one of the physical layer cell values from the generated consequent physical layer cell matrix to resolve the physical layer cell color code collision.

15. The apparatus of claim 12, wherein in generating the initial physical layer cell identity matrix:
the arrays created are six in number;
the particular modulus combination pair is a MOD 3 and MOD 6 combination pair; and
the assigned codes for each of the arrays are color codes.

16. The apparatus of claim 13, where color codes comprise:
a first code where {(PCI MOD 6)==0} && {(PCI MOD 3)==0)};
a second code where {(PCI MOD 6)==3} && {(PCI MOD 3)==0)};
a third code where {(PCI MOD 6)==1} && {(PCI MOD 3)==1)};
a fourth code where {(PCI MOD 6)==4} && {(PCI MOD 3)==1)};
a fifth code where {(PCI MOD 6)==2} && {(PCI MOD 3)==2)}; and
a sixth code where {(PCI MOD 6)==5} && {(PCI MOD 3)==2)}, and
where PCI represents a physical cell identity value.

17. The apparatus of claim 16, where the first code and second code cannot touch each other, the third code and fourth code cannot touch each other, and the fifth and sixth code cannot touch each other.

18. The apparatus of claim 14, where the new cell transitions to a learned state after a period of time which can span one to thirty-one days without detecting a PCI color code collision.

19. The apparatus of claim 16, wherein the at least one memory with the computer program is further configured, with the at least one processor, to cause the apparatus to at least perform or control:
in monitoring collisions, resolving color code collisions among one or more cells that are in a learning state and learned states.

20. A program storage device readable by a machine, tangibly embodying a program of instructions executable by the machine for performing operations, said operations comprising:
obtaining geographical coordinates for a cell based upon the location of the cell;
generating an initial physical layer cell identity (PCI) matrix for the cell based upon a sub set of physical layer cell values allocated for the location of the cell,
wherein generating the initial physical layer cell identity matrix comprises:
creating arrays corresponding to a particular modulus combination pair;
assigning codes for each of the arrays; and
assigning physical layer cell values to each coded array; and
wherein the generating of the initial physical layer cell identity matrix is performed to eliminate interference among primary and secondary synchronization signaling for the cell based upon a sub set of physical layer cell values allocated for the location of the cell;
using one of the physical layer cell values contained in the generated initial physical layer cell matrix for a new cell,
wherein the generated physical layer cell matrix being mapped to the location of the new cell; and
monitoring for physical layer cell color code collisions among neighboring cells reported by one or more user equipment in range of the new cell and neighboring cells,
wherein when a physical layer cell color code collision occurs, generating a consequent physical layer cell matrix using unallocated physical layer cell values for the location of the new cell.

* * * * *